United States Patent
Breuer et al.

(10) Patent No.: US 10,543,565 B2
(45) Date of Patent: Jan. 28, 2020

(54) LASER WELDING METHOD FOR PRODUCING A SEMI-FINISHED SHEET METAL PRODUCT MADE OF HARDENABLE STEEL AND COMPRISING A COATING BASED ON ALUMINIUM OR ALUMINIUM-SILICON

(71) Applicant: WISCO Tailored Blanks GmbH, Duisburg (DE)

(72) Inventors: Arndt Breuer, Bergisch Gladbach (DE); Christian Both, Duisburg (DE)

(73) Assignee: WISCO Tailored Blanks GmbH, Duisburg (DE)

( * ) Notice: Subject to any disclaimer, the term of this patent is extended or adjusted under 35 U.S.C. 154(b) by 0 days.

(21) Appl. No.: 15/755,805

(22) PCT Filed: Sep. 20, 2016

(86) PCT No.: PCT/EP2016/072213
§ 371 (c)(1),
(2) Date: Feb. 27, 2018

(87) PCT Pub. No.: WO2017/050711
PCT Pub. Date: Mar. 30, 2017

(65) Prior Publication Data
US 2018/0326538 A1 Nov. 15, 2018

(30) Foreign Application Priority Data
Sep. 21, 2015 (DE) .................. 10 2015 115 915

(51) Int. Cl.
*B23K 26/26* (2014.01)
*C22C 38/02* (2006.01)
(Continued)

(52) U.S. Cl.
CPC .......... *B23K 26/26* (2013.01); *B23K 35/3066* (2013.01); *B32B 15/012* (2013.01);
(Continued)

(58) Field of Classification Search
CPC .. B23K 26/26; B23K 26/322; B23K 35/3066; B23K 2103/08; B23K 2103/04; B23K 2103/50; B23K 2101/18; B23K 2101/34
See application file for complete search history.

(56) References Cited

U.S. PATENT DOCUMENTS 8,319,148 B2   11/2012  Nowak et al.
2007/0119829 A1   5/2007  Vietz et al.
(Continued)

FOREIGN PATENT DOCUMENTS

CA       2891732 C     5/2014
DE   102010018687 A1  10/2011
(Continued)

*Primary Examiner* — Brian W Jennison
(74) *Attorney, Agent, or Firm* — The Webb Law Firm

(57) ABSTRACT

A method for producing a tailor-made semi-finished sheet metal product where two steel sheets of different material grades and/or thicknesses are joined by laser welding. At least one of the sheets is press-hardenable steel having a metallic coating of aluminium or aluminium-silicon. Filler wire is fed into the weld melt. The filler wire is substantially free of aluminium and contains at least one alloy element which promotes the formation of austenite in a content that is at least 0.1 wt. % greater than that in the press-hardenable steel. The filler wire is heated before being fed into the weld melt. The steel sheets have a gap delimited by the edges of the sheets having an average width of at least 0.15 mm. The ratio of the volume of filler wire inserted into the gap to the volume of the steel sheet material melted by the laser beam is at least 20%.

15 Claims, 2 Drawing Sheets

(51) Int. Cl.
    *B23K 35/30*     (2006.01)
    *B32B 15/01*     (2006.01)
    *C22C 38/00*     (2006.01)
    *C22C 38/06*     (2006.01)
    *C22C 38/28*     (2006.01)
    *C22C 38/32*     (2006.01)
    *C22C 38/44*     (2006.01)
    *B23K 103/04*     (2006.01)

(52) U.S. Cl.
    CPC ............ *C22C 38/002* (2013.01); *C22C 38/02* (2013.01); *C22C 38/06* (2013.01); *C22C 38/28* (2013.01); *C22C 38/32* (2013.01); *C22C 38/44* (2013.01); *B23K 2103/04* (2018.08)

(56) References Cited

U.S. PATENT DOCUMENTS

| | | |
|---|---|---|
| 2012/0279621 A1 | 11/2012 | Gerber et al. |
| 2012/0325379 A1 | 12/2012 | Baulig et al. |
| 2013/0098878 A1 | 4/2013 | Briand et al. |
| 2013/0236239 A1 | 9/2013 | Brandt et al. |
| 2014/0003860 A1* | 1/2014 | Evangelista ........... B23K 9/235 403/270 |
| 2014/0008335 A1 | 1/2014 | Yao et al. |
| 2014/0013176 A1 | 1/2014 | Whetsel |
| 2014/0263208 A1 | 9/2014 | Karlsen et al. |
| 2015/0043962 A1 | 2/2015 | Miyazaki et al. |
| 2015/0306702 A1* | 10/2015 | Breuer ................... B23K 26/26 219/121.64 |
| 2017/0120391 A1* | 5/2017 | Schmit ................... B23K 26/26 |

FOREIGN PATENT DOCUMENTS

| | | |
|---|---|---|
| DE | 102012111118 B3 | 4/2014 |
| DE | 102013101953 A1 | 8/2014 |
| EP | 1878531 A1 | 1/2008 |
| EP | 2007545 A1 | 12/2008 |
| KR | 20140013176 A | 2/2014 |
| KR | 1020140113878 A | 9/2014 |
| KR | 1020150032121 A | 3/2015 |
| KR | 1020150032121 A | 8/2015 |
| RU | 2355539 C2 | 5/2009 |
| RU | 2456107 C1 | 7/2012 |
| RU | 2013105801 A | 8/2014 |
| RU | 2553142 C2 | 6/2015 |
| RU | 2556795 C2 | 7/2015 |
| WO | 2007125182 A1 | 11/2007 |
| WO | 2013014481 A1 | 1/2013 |
| WO | 2014005041 A1 | 1/2014 |

* cited by examiner

LASER WELDING METHOD FOR PRODUCING A SEMI-FINISHED SHEET METAL PRODUCT MADE OF HARDENABLE STEEL AND COMPRISING A COATING BASED ON ALUMINIUM OR ALUMINIUM-SILICON

CROSS-REFERENCE TO RELATED APPLICATIONS

This application is the United States national phase of International Application No. PCT/EP2016/072213 filed Sep. 20, 2016, and claims priority to German Patent Application No. 10 2015 115 915.5 filed Sep. 21, 2015, the disclosures of which are hereby incorporated in their entirety by reference.

BACKGROUND OF THE INVENTION

Field of the Invention

The invention relates to a method for producing a tailor-made semi-finished sheet metal product that can be hot formed, in which at least two steel sheets of different material grades and/or thicknesses are joined in a butt joint by means of laser welding, at least one of the sheets being produced from press-hardenable steel and comprising a metallic coating based on aluminium or aluminium-silicon, the laser welding being carried out while filler wire is fed into the weld melt produced solely by means of at least one laser beam, the filler wire being substantially free of aluminium and containing at least one alloy element which promotes the formation of austenite and is present in the filler wire in a content by weight that is at least 0.1 wt. % greater than that in the press-hardenable steel, and the filler wire being heated by means of a heating device before being fed into the weld melt.

Description of Related Art

Tailor-made blanks made of a steel sheet (referred to as "tailored blanks") are used in automotive manufacture in order to meet high requirements with regard to crash safety, while keeping the vehicle body weight as low as possible. For this purpose, individual blanks or strips of different material grades and/or sheet thicknesses are joined to one another in a butt joint by means of laser welding. In this way, different points on a vehicle body component can be adapted to different loads. For example, a thick or high-strength steel sheet can be used at points subject to high loads and thinner sheets or sheets of relatively low deep-drawing grades can be used at the remaining points. Owing to tailor-made sheet metal blanks of this kind, additional reinforcement parts are not required on the vehicle body. This saves material and makes it possible to reduce the overall weight of the vehicle body.

In modern vehicle body manufacture, manganese-boron steels are used which achieve high strengths, for example tensile strengths in the range of from 1,500 to 2,000 MPa, during hot forming and rapid cooling. In the initial state, manganese-boron steels typically have a ferritic-pearlitic microstructure and have a tensile strength of approximately 600 MPa. A martensitic microstructure can be developed, however, by means of press hardening, i.e. by heating the steel to the austenitising temperature and subsequently rapidly cooling same, such that the steels treated in this manner can reach tensile strengths in the range of from 1,500 to 2,000 MPa.

Inter alia for reasons relating to corrosion protection, steel sheets are coated with a metallic anti-corrosion layer. A press-hardenable steel sheet for producing tailored banks is usually provided with a metallic coating based on aluminium-silicon. In this case, the metallic coating is composed of an inner layer made of an intermetallic alloy and an outer layer made of a metal alloy. However, significant difficulties are associated with the use of coated steel sheets of this kind. This is because, when welding the coated steel blanks, some of the AlSi coating enters the weld melt produced at the butt joint and can form brittle intermetallic phases or ferritic regions that still exist even after the blank has been austenitised and quenched. Subsequent mechanical loading, under static or dynamic conditions, sometimes results in the weld seam failing or fracturing at said intermetallic or ferritic regions. It has already been proposed that, in order to prevent some of the AlSi coating from flowing into the weld melt, the coating be removed from the rim region of the blank edge to be welded before welding takes place. This additional process step is very costly and time-consuming, however.

EP 2 007 545 B1 proposes only removing the outer metal alloy layer from the AlSi coating, which layer can be taken off in a relatively simple manner by means of brushes or by means of a laser beam. In this case, the intermetallic alloy layer, which is by contrast significantly thinner and more difficult to remove, is left on the steel sheet to be welded. However, this partial removal of the coating is also costly and time-consuming. Furthermore, when welding steel blanks from which the coating has been removed in part according to EP 2 007 545 B1, an amount of aluminium from the intermetallic alloy layer that enters the weld melt may be still high enough for a reduction in the hardenability of the weld seam to sometimes be observed.

Additionally, the laser welding of tailored blanks sometimes results in a reduction in the load-bearing sheet metal cross section. Owing to the cutting gap which is produced when the steel sheet to be welded is cut to size, the top layer sometimes sinks and/or the root of the weld sometimes becomes concave at the weld seam. This problem exists primarily in combinations of sheets having the same sheet thickness and different material grades. Unlike in tailored blanks for cold forming, after being heat treated in the furnace and quenched, the weld seam of tailored blanks for hot forming does not have an increased strength by comparison with the steel material of the sheets. In tailored blanks for cold forming, this increase in strength can compensate for the effect of the reduced sheet metal cross section. This is not conventionally possible in tailored blanks for hot forming.

EP 1 878 531 B1 discloses a laser-arc hybrid welding method in which blanks which are made of manganese-boron steel and have an aluminium-containing coating are interconnected in a butt joint, the laser beam being combined with at least one electric arc in order to melt the metal at the butt joint and weld the blanks to one another. In this case, the arc is discharged by means of a tungsten welding electrode or is formed by using an MIG welding torch at the end of a filler wire. The filler wire may contain alloy elements (e.g. Mn and Ni) which promotes austenitic transition of the weld seam microstructure, and thus promotes hardenability. This hybrid welding method is intended to make it possible to weld blanks, which are made of manganese-boron steel, can be hot formed and are provided with a coating based on aluminium-silicon, without previously removing the coating material in the region of the weld seam to be produced, while at the same time ensuring that aluminium on the abutting edges of the blanks does not lead to a reduction in the tensile strength of the component in the weld seam. Providing an electric arc after the laser beam should result in the weld melt being homogenised and thus in local aluminium concentrations of greater than 1.2 wt. %, which produces a ferritic microstructure, being eliminated.

The laser beam-arc hybrid welding method is, however, comparatively slow and is costly in terms of energy consumption as a result of the additional arc being produced. Furthermore, this method produces a very wide weld seam having thick seam and root extension.

Furthermore, DE 10 2012 111 118 B3 from the applicant discloses a method for laser welding workpieces made of manganese-boron steel (MnB steel) in a butt joint, in which the workpieces have a thickness of at least 1.8 mm and/or the thickness discontinuity at the butt joint by at least 0.4 mm, and in which the laser welding is carried out while filler wire is fed into the weld melt produced solely by means of a laser beam. In this method, in order to ensure that the weld seam can be reliably hardened during hot forming so as to have a martensitic microstructure, the filler wire contains at least one alloy element from the group comprising manganese, chromium, molybdenum, silicon and/or nickel, which element promotes the formation of austenite in the weld melt, said alloy element being present in the filler wire in a content by weight that is at least 0.1 wt. % greater than that in the press-hardenable steel of the workpieces. In this case, the workpieces can comprise a metallic coating based on aluminium or aluminium-silicon which is removed from the rim along the abutting edges to be welded before laser welding takes place. Moreover, in this method, the filler wire is heated to a temperature of at least 50° C., at least in a longitudinal portion, before being fed into the weld melt. The method has proven successful in practice. However, using laser radiation or mechanical ablation to remove the metallic coating on the rim of the steel sheets to be welded is very costly and time-consuming.

SUMMARY OF THE INVENTION

The object of the invention is to provide a laser welding method by means of which steel sheets of different material grades and/or thicknesses, and of which at least one sheet is produced from hardenable steel and comprises a metallic coating based on aluminium or aluminium-silicon, can be joined in a butt joint, the weld seam of which can reliably transition into a martensitic microstructure (e.g. in a MnB-MnB connection) or a mixed microstructure (e.g. in a connection of MnB steel and microalloyed steel) during hot forming (press hardening), it being intended for the welding method to be comparatively cost effective and to provide an optimised weld seam geometry.

The method according to the invention is used to produce a tailor-made semi-finished sheet metal product that can be hot formed. In the method, at least two steel sheets of different material grades and/or thicknesses are joined in a butt joint by means of laser welding, at least one of the steel sheets being produced from press-hardenable steel, preferably manganese-boron steel, and comprising a metallic coating based on aluminium or aluminium-silicon. The laser welding is carried out while filler wire is fed into the weld melt produced solely by means of at least one laser beam, the filler wire being substantially free of aluminium and containing at least one alloy element which promotes the formation of austenite and is present in the filler wire in a content by weight that is at least 0.1 wt. % greater than that in the press-hardenable steel, and the filler wire being heated by means of a heating device before being fed into the weld melt. The method according to the invention is additionally characterised in that the steel sheets are welded to one another such that there is a gap which is delimited by the edges of said sheets that are to be welded and has an average width of at least 0.15 mm, the amount of material of the filler wire which is inserted into the gap being such that the ratio of the volume of filler wire inserted into the gap to the volume of the steel sheet material melted by means of the at least one laser beam is at least 20%, preferably at least 30%.

In the context of the invention, a filler wire which is free of aluminium or substantially free of aluminium is understood to mean a filler wire that contains no aluminium, except for unavoidable impurities or unavoidable trace amounts.

In the laser welding method according to the invention, it is not necessary for a metallic coating based on aluminium or aluminium-silicon to be previously removed from the rim of the steel sheet that comprises said coating, and so said coating is accordingly not previously removed from said edge. As a result of omitting the removal (ablation) of the metallic coating from the rim, the method according to the invention is significantly more cost effective than the known method according to EP 2 007 545 B1.

Given that the steel sheets are joined according to the invention such that there is a gap having an average width of at least 0.15 mm, preferably at least 0.18 mm, particularly preferably at least 0.2 mm, the laser beam diameter or the laser beam width at the point at which said laser impinges on the joint remaining substantially unchanged by comparison with the standard laser beam diameter, it is ensured that less material of the steel sheets and therefore also less volume of the aluminium-containing coating is melted and flows into the weld melt. The gap which is adjusted by positioning the sheets is filled with the melted material of the filler wire that is substantially free of aluminium. Furthermore, insertion of the filler wire results in improved homogenisation of the weld melt, i.e. the aluminium volume flowing into the melt from the metallic coating is significantly reduced and distributed in a very homogenous or approximately homogenous manner. According to the invention, the amount of material of the filler wire which is inserted in the gap is such that the ratio of the volume of filler wire inserted in the gap to that of the steel sheet material melted by means of the laser beam is at least 20% or at least 30%, preferably at least 35%, particularly preferably at least 40%.

The average width of the gap should preferably be set at no more than 0.5 mm. Therefore, the method according to the invention can be carried out using conventional laser beam welding optics, since the diameter or the width of the laser beam at the point at which it impinges on the joint is supposed to remain as unchanged as possible. A lower average width of the gap, and welding solely by means of laser radiation, provide for a narrow weld seam having little seam and root extension by comparison with the relatively wide weld seam in laser-arc hybrid welding. For the same reasons, the ratio of the volume of filler wire inserted into the gap to the volume of the steel sheet material melted by means of the at least one laser beam should be no greater than 60%.

The filler wire used in the method according to the invention is substantially free of aluminium and contains at least one alloy element which promotes the formation of austenite and is present in the filler wire in a content by weight that is at least 0.1 wt. %, preferably at least 0.2 wt. %, greater than that in the press-hardenable steel. By adding one or more alloy elements which promote the formation of austenite, the hardenability of the weld seam is improved. The filler wire preferably contains at least manganese and/or nickel as the alloy elements which promote the formation of austenite or stabilise the austenite.

In another preferred embodiment of the method according to the invention, the filler wire used therein has the following composition: from 0.05 to 0.15 wt. % C, from 0.5 to 2.0 wt. % Si, from 1.0 to 3.0 wt. % Mn, from 0.5 to 2.0 wt. % Cr+Mo, from 1.0 to 4.0 wt. % Ni, and the balance Fe and unavoidable impurities. Internal tests have shown that, using the method according to the invention, by means of a filler wire of this type, it can be ensured that the weld seam very reliably completely transitions into a martensitic microstructure (e.g. for a MnB-MnB connection) or a mixed microstructure (e.g. for a connection of MnB steel and microalloyed steel) when subsequently hot forming (press hardening) the tailored blank.

According to another preferred embodiment of the method according to the invention, the filler wire used therein has a carbon content by weight that is at least 0.1 wt. % lower than that of the press-hardenable steel of at least one of the sheets to be welded to one another. This prevents the weld seam from becoming brittle. In particular, the relatively low carbon content of the filler wire results in very high residual ductility of the weld seam.

According to the invention, the filler wire is heated by means of a heating device before being fed into the weld melt. For example, the filler wire is heated by means of the heating device to a temperature of at least 60° C., preferably at least 100° C., particularly preferably at least 150° C., in particular at least 180° C., before being fed (before flowing) into the melt. This permits a significantly higher welding speed by comparison with using an unheated filler wire. This is because the end of the heated filler wire can be melted more quickly by means of the laser beam. Furthermore, the welding process is made more stable as a result of the filler wire being heated before being fed into the weld melt.

In the method according to the invention, the welding speed or the speed at which the steel sheets to be welded to one another in a butt joint are moved relative to the laser beam is at least 3 m/min, preferably at least 6 m/min, particularly preferably at least 9 m/min.

In order to heat the filler wire in a rapid and efficient manner, in the method according to the invention, a heating device is preferably used that heats the filler wire inductively, electrically, conductively or by means of heat radiation before said wire is fed into the weld melt. In this case, the electrical heating of the filler wire preferably takes place such that an electric current is conducted through the filler wire by means of contacts. The speed at which the filler wire is fed in is preferably in the range of from 70 to 100% of the laser welding speed.

By comparison with laser beam welding which takes place after a coating has been previously removed from the rims of the coated steel sheets to be welded in a butt joint, the method according to the invention achieves an optimised weld seam geometry, specifically a larger load-bearing sheet edge cross section. This is particularly advantageous when the weld seam is subsequently loaded dynamically.

A manganese-boron steel is preferably used as the press-hardenable steel. In a preferred embodiment of the method according to the invention, at least one of the steel sheets to be welded to one another in a butt joint is selected such that it comprises a press-hardenable steel of the following composition: from 0.10 to 0.50 wt. % C, a maximum of 0.40 wt. % Si, from 0.50 to 2.00 wt. % Mn, a maximum of 0.025 wt. % P, a maximum of 0.010 wt. % S, a maximum of 0.60 wt. % Cr, a maximum of 0.50 wt. % Mo, a maximum of 0.050 wt. % Ti, from 0.0008 to 0.0070 wt. % B, a minimum of 0.010 wt. % Al, and the balance Fe and unavoidable impurities. The components produced from a steel sheet of this type have a relatively high tensile strength after being press hardened. Sheets made of different or identical manganese-boron steels can also be welded by means of the method according to the invention in order to provide tailor-made semi-finished sheet metal products that have a strength that is maximised by means of press hardening.

Another advantageous embodiment of the method according to the invention is characterised in that at least one of the steel sheets cannot be press hardened and is produced from microalloyed steel, for example. Combining a sheet made of press-hardenable steel, such as manganese-boron steel, with a sheet made of microalloyed steel makes it possible to obtain a very different tensile strength or ductility in particular regions of a vehicle body component, e.g. a B pillar. In this case, the microalloyed steel preferably has the following composition: from 0.05 to 0.15 wt. % C, a maximum of 0.35 wt. % Si, from 0.40 to 1.20 wt. % Mn, a maximum of 0.030 wt. % P, a maximum of 0.025 wt. % S, from 0.01 to 0.12 wt. % Nb, from 0.02 to 0.18 wt. % Ti, from 0.0008 to 0.0070 wt. % B, at least 0.010 wt. % Al, and the balance Fe and unavoidable impurities. A steel of this type is characterised by a high elongation at fracture $A_{80}$ of at least 21%.

The steel sheets used in the method according to the invention have a sheet thickness including the metallic coating in the range of from 0.6 to 3.0 mm, for example.

According to another advantageous embodiment of the method according to the invention, the at least one laser beam is a line focus beam which is directed towards the edges of the steel sheets that are to be welded to one another, such that the longitudinal axis of the line focus beam impinging on the edges extends substantially in parallel with said edges. On account of the focal line, the weld melt remains liquid for longer before solidifying. This also contributes to improved mixing (homogenisation) of the weld melt. The length of the focal line can be in the range of from 1.2 to 2.0 mm, for example.

In another embodiment of the method according to the invention, in order to prevent the weld seam from becoming brittle, protective gas (inert gas) is supplied to the weld melt during the laser welding. In this case, pure argon, helium, nitrogen or a mixture of argon, helium, nitrogen and/or carbon dioxide and/or oxygen is preferably used as the protective gas.

DESCRIPTION OF THE INVENTION

Figure 1:
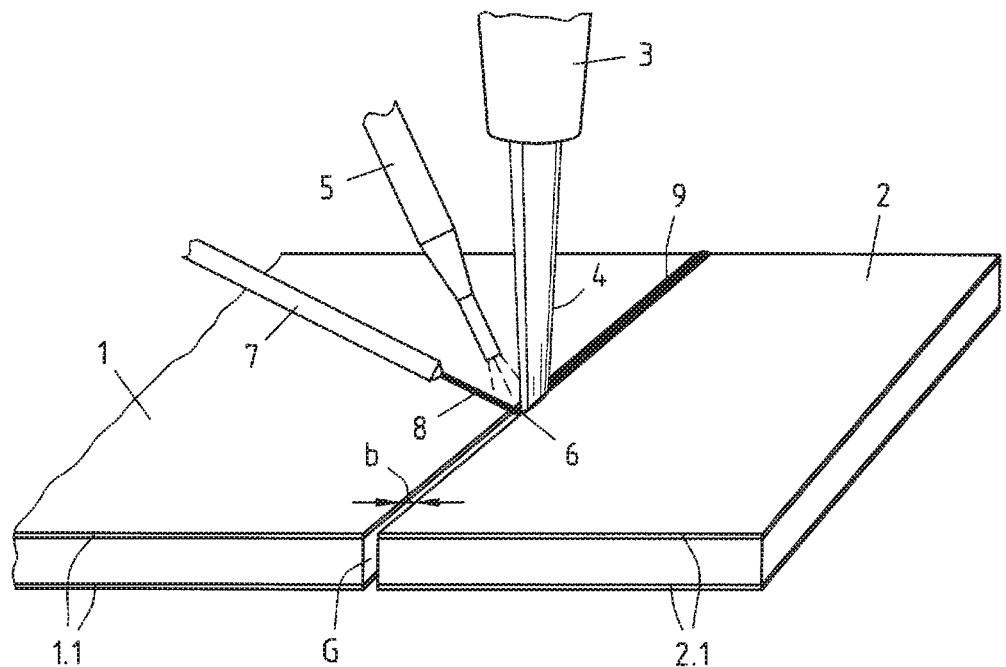
FIG. 1 is a perspective view of parts of a device for carrying out the laser welding method according to the invention, in which two steel blanks, which are of substantially the same thickness and differ from one another by the material grades thereof, are welded to one another in a butt joint.

FIG. 1 schematically shows parts of a laser welding device by means of which the laser welding method according to the invention can be carried out. The device comprises a base or movable support plate (not shown) on which two blanks or sheets 1, 2 made of steel of different material grades are arranged. One of the sheets 1, 2 is produced from press-hardenable steel, preferably manganese-boron steel, whereas the other sheet 2 or 1 is produced from a steel of a relatively low deep-drawing grade, preferably a microalloyed steel.

The press-hardenable steel can have the following chemical composition for example:
 a maximum of 0.4 wt. % C,
 a maximum of 0.4 wt. % Si,
 a maximum of 2.0 wt. % Mn,
 a maximum of 0.025 wt. % P,
 a maximum of 0.010 wt. % S,
 a maximum of 0.8 wt. % Cr+Mo,
 a maximum of 0.05 wt. % Ti,
 a maximum of 0.007 wt. % B,
 a minimum of 0.015 wt. % Al, and
 the balance Fe and unavoidable impurities.

In the delivery state, i.e. before heat treatment and rapid cooling, the yield point Re of the press-hardenable steel 1 or 2 is preferably at least 300 MPa, the tensile strength Rm thereof is at least 480 MPa, and the elongation at fracture $A_{80}$ thereof is in the range of from 10 to 15%. After being hot formed (press hardened), i.e. after being heated to an austenitising temperature of approximately 900 to 920° C. and subsequently rapidly cooled, said steel sheet 1 or 2 has a yield point Re of approximately 1,100 MPa, a tensile strength Rm of from approximately 1,500 to 2,000 MPa, and an elongation at fracture $A_{80}$ of approximately 5%.

The steel of the sheet 2 or 1 having a relatively low deep-drawing grade or the microalloyed steel has, by contrast, the following chemical composition for example:
 a maximum of 0.1 wt. % C,
 a maximum of 0.35 wt. % Si,
 a maximum of 1.0 wt. % Mn,
 a maximum of 0.030 wt. % P,
 a maximum of 0.025 wt. % S,
 a maximum of 0.10 wt. % Nb,
 a maximum of 0.15 wt. % Ti,
 a maximum of 0.007 wt. % B,
 a minimum of 0.015 wt. % Al, and
 the balance Fe and unavoidable impurities.

At least one of the sheets 1, 2 comprises a metallic coating 1.1, 2.1 based on aluminium or aluminium-silicon. In the example shown in FIG. 1, both sheets 1, 2 are provided with a coating 1.1, 2.1 of this kind. The coating 1.1, 2.1 can typically be applied to a steel strip by means of a continuous hot-dip coating process, from which strip the sheets 1, 2 are subsequently obtained by being cut to size.

The sheets 1, 2 shown in FIG. 1 are of substantially the same thickness. The thickness of the sheets 1, 2, including the coating 1.1, 2.1, is in the range of from 0.6 to 3.0 mm, for example. The thickness of the coating 1.1, 2.1 on the relevant upper or lower face of the sheet 1, 2 is, for example, in the range of from approximately 10 to 120 μm, and is preferably less than or equal to 50 μm.

Shown above the sheets 1, 2 is a portion of a laser welding head 3 which is provided with optics (not shown) for supplying a laser beam 4, and a focusing apparatus for concentrating the laser beam 4. Furthermore, a line 5 for supplying protective gas is arranged on the laser welding head 3. The protective gas line 5 opens substantially into the focal region of the laser beam 4 or the weld melt 6 produced by means of the laser beam 4. Pure argon or a mixture of argon and helium and/or carbon dioxide is preferably used as the protective gas.

Additionally, the laser welding head 3 is assigned a wire feed apparatus 7 by means of which the weld melt 6 is supplied with a specific filler material in the form of a wire 8, which is also melted by means of the laser beam 4. The weld seam is provided with reference numeral 9. The filler wire 8 is substantially free of aluminium and contains at least one alloy element, preferably manganese and/or nickel, which promotes the formation of austenite or stabilises the austenite.

The blanks or sheets 1, 2 are joined in a butt joint such that there is a gap G, the width of which is at least 0.15 mm, preferably at least 0.2 mm. The average width b of the gap G which is delimited by the sheet edges that are to be welded to one another is in the range of from 0.15 to 0.5 mm. In the coated steel sheet 1 and/or 2, the aluminium or aluminium-silicon coating 1.1, 2.1 extends as far as the sheet edge to be welded in the butt joint. The sheets 1, 2 are thus welded without the coating being (previously) removed from the rim of the sheet edge to be welded.

The focusing apparatus concentrates the laser beam 4 so as to form a substantially punctiform or circular focal point or preferably so as to form a focal line. The diameter or the width of the laser beam 4 at the point at which it impinges on the sheets 1, 2 is in the range of from approximately 0.7 to 0.9 mm. The relatively wide gap G, the width b of which is at least 0.15 mm and can be in the range of from 0.25 to 0.5 mm for example, ensures that less material of the sheets 1, 2 and therefore also less volume of the aluminium-containing coating 1.1, 2.1, is melted and flows into the melt 6. The gap G is filled with the melted material of the filler wire 8 which has a diameter in the range of from approximately 0.8 to 1.2 mm in the solid state. Insertion of the filler material into the gap G results in significant thinning and a homogenous distribution of the aluminium flowing into the melt 6 from the melted rim of the coating 1.1, 2.1. The ratio of the volume of filler wire inserted into the gap G to the volume of the steel sheet material melted by means of the laser beam 4 is at least 20%, and is preferably approximately in the range of from 30 to 60%.

The filler wire 8 has the following chemical composition for example:
 0.1 wt. % C,
 0.9 wt. % Si,
 2.2 wt. % Mn,
 0.4 wt. % Cr,
 0.6 wt. % Mo,
 2.2 wt. % Ni, and
 the balance Fe and unavoidable impurities.

In this case, the manganese content of the filler wire 8 is greater than the manganese content of the press-hardenable steel sheet. The manganese content of the filler wire 8 is preferably at least 0.2 wt. % greater than the manganese content of the press-hardenable steel sheet. It is also advantageous for the chromium and molybdenum content of the filler wire 8 to also be greater than that of the press-hardenable steel sheet 1 or 2. The combined chromium-molybdenum content of the filler wire 8 is preferably at least 0.1 wt. % greater than the combined chromium-molybdenum content of the press-hardenable steel sheet 1 or 2. The nickel content of the filler wire 8 is preferably in the range of from 1.0 to 4.0 wt. %, in particular in the range of from 2.0 to 2.5 wt. %.

Furthermore, the filler wire 8 preferably has a lower carbon content than the press-hardenable steel sheet 1 or 2. The carbon content of the filler wire 8 is preferably in the range of from 0.05 to 0.15 wt. %.

The filler wire 8 is fed in a heated state to the melt 6 produced by means of the laser beam 4. For this purpose, the wire feed apparatus 7 is equipped with a heating device (not shown) which heats the filler wire 8 preferably inductively, electrically, conductive or by means of heat radiation. The portion of the filler wire 8 heated in this way has a temperature of at least 60° C. for example, preferably at least 150° C., particularly preferably at least 180° C.

With regard to the laser source of the laser welding device, the laser type thereof is for example a $CO_2$ laser, diode laser or fibre laser. During the welding process, the laser source provides an energy input per unit length of at least 0.3 kJ/cm with a laser output of at least 7 kW. The welding speed is for example in the range of from 3 to 9 m/min or preferably above 8 m/min. In this case, the filler wire 8 is fed in at a speed in the range of from 70 to 100% of the laser welding speed.

Figure 2:
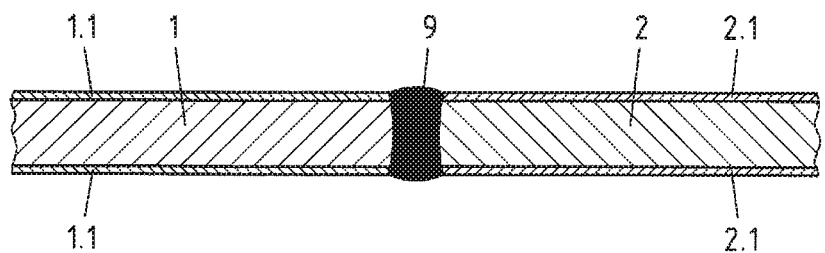
FIG. 2 is a cross section through a portion of the steel blanks from FIG. 1 that are welded to one another.
Figure 3:
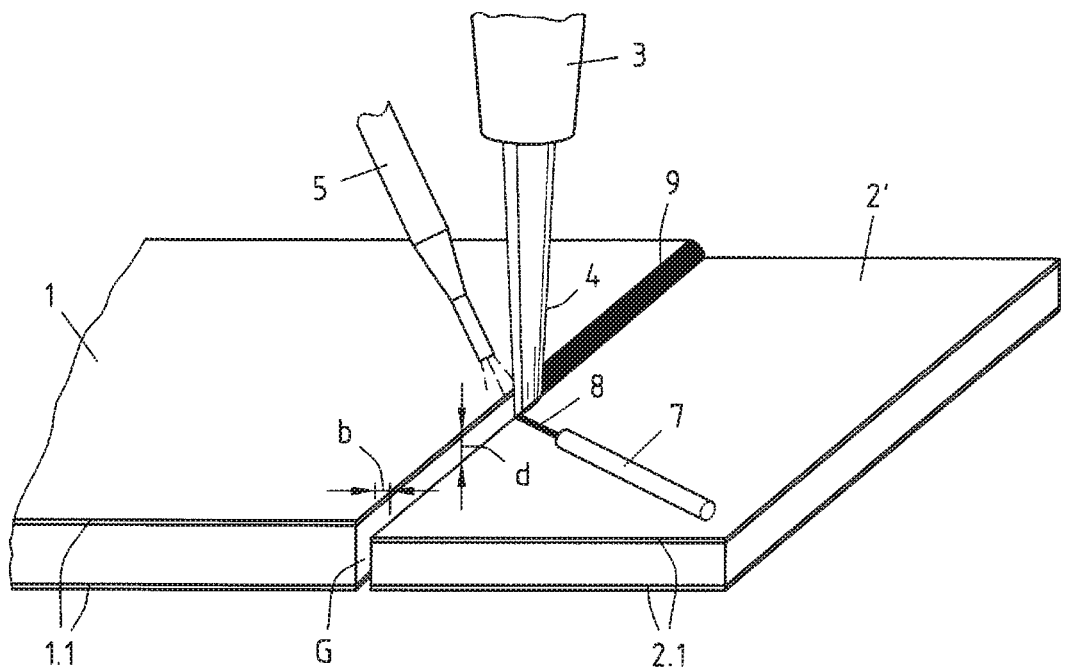
FIG. 3 is a perspective view of parts of a device for carrying out the laser welding method according to the invention, in which two steel blanks of different thickness and different material grades are welded to one another in a butt joint.
Figure 4:
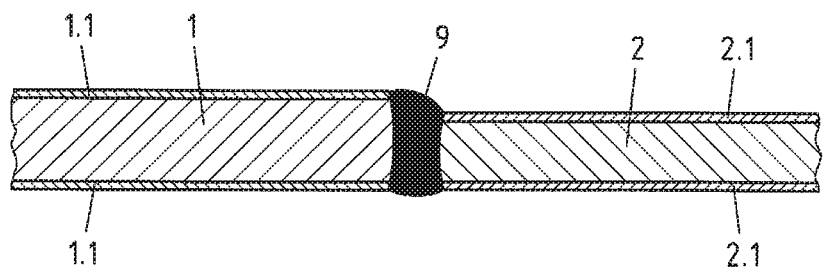
FIG. 4 is a cross section through a portion of the steel blanks from FIG. 3 that are welded to one another.

The embodiment shown in FIGS. 3 and 4 differs from the embodiment in FIGS. 1 and 2 in that the steel sheets 1, 2' are of different thicknesses and therefore there is a discontinuity d in thickness of at least 0.2 mm at the butt joint. For example, the press-hardenable steel sheet 1 has a sheet thickness in the range of from 0.5 mm to 1.2 mm, whereas the sheet 2' made of microalloyed steel or relatively ductile steel has a sheet thickness in the range of from 1.4 mm to 3.0 mm.

The invention claimed is:

1. A method for producing a tailor-made semi-finished sheet metal product that can be hot formed, in which at least two steel sheets of different material grades and/or thicknesses are joined by means of laser welding, at least one of the steel sheets being produced from press-hardenable steel and at least one of the steel sheets having a metallic coating based on aluminium or aluminium-silicon on at least one outer surface, the laser welding being carried out while filler wire is fed into a weld melt produced solely by means of at least one laser beam, the filler wire being substantially free of aluminium and containing at least one alloy element which promotes the formation of austenite and is present in the filler wire in a content by weight that is at least 0.1 wt. % greater than the content in the press-hardenable steel, and the filler wire is heated by a heating device before being fed into the weld melt, wherein, before welding, the edges of the steel sheets that are to be welded to one another are spaced apart from one another such that there is a gap between the edges of the steel sheets which is delimited by the edges of the steel sheets and has an average width extending between the edges of the steel sheets of at least 0.15 mm, and at the time of welding, the metallic coating on the at least one outer surface of the at least one steel sheet extends to the edge of the at least one steel sheet, and the amount of material of the filler wire which is inserted into the gap is such that the ratio of the volume of filler wire inserted into the gap to the volume of the steel sheet material melted by the at least one laser beam is 30 to 60%.

2. The method according to claim 1, wherein the steel sheets are positioned such that the gap delimited by the edges of said sheets that are to be welded to one another has an average width in the range of from 0.15 to 0.5 mm.

3. The method according to claim 1, wherein the heating device heats the filler wire inductively, electrically, conductively or by heat radiation before said wire is fed into the weld melt.

4. The method according to claim 1, wherein the filler wire is heated by means of the heating device to a temperature of at least 100° C. before being fed into the weld melt.

5. The method according to claim 1, wherein the press-hardenable steel is a manganese-boron steel.

6. The method according to claim 1, wherein the press-hardenable steel has the following composition:
0.10 to 0.50 wt. % C,
a maximum of 0.40 wt. % Si,
0.50 to 2.0 wt. % Mn,
a maximum of 0.025 wt. % P,
a maximum of 0.010 wt. % S,
a maximum of 0.60 wt. % Cr,
a maximum of 0.50 wt. % Mo,
a maximum of 0.050 wt. % Ti,
0.0008 to 0.0070 wt. % B,
a minimum of 0.010 wt. % Al, and
the balance Fe and unavoidable impurities.

7. The method according to claim 1, wherein at least one of the steel sheets is produced from microalloyed steel.

8. The method according to claim 7, wherein the microalloyed steel has the following composition:
0.05 to 0.15 wt. % C,
a maximum of 0.35 wt. % Si,
0.40 to 1.20 wt. % Mn,
a maximum of 0.030 wt. % P,
a maximum of 0.025 wt. % S,
0.01 to 0.12 wt. % Nb,
0.02 to 0.18 wt. % Ti,
0.0008 to 0.0070 wt. % B,
a minimum of 0.010 wt. % Al, and
the balance Fe and unavoidable impurities.

9. The method according to claim 1, wherein the at least one laser beam in the form of a line focus beam is directed towards the edges of the steel sheets that are to be welded to one another such that a longitudinal axis of the line focus beam impinging on the edges extends substantially in parallel with said edges.

10. The method according to claim 1, wherein the filler wire contains at least one of manganese and nickel as the alloy elements that promote the formation of austenite.

11. The method according to claim 1, wherein the filler wire has the following composition:
0.05 to 0.15 wt. % C,
0.5 to 2.0 wt. % Si,
1.0 to 3.0 wt. % Mn,
0.5 to 2.0 wt. % Cr+Mo,
1.0 to 4.0 wt. % Ni, and
the balance Fe and unavoidable impurities.

12. The method according to claim 1, wherein the filler wire has a carbon content by weight that is at least 0.1 wt. % lower than the carbon content of the press-hardenable steel.

13. The method according to claim 1, wherein the speed in terms of m/min. at which the filler wire is inserted into the gap is 70 to 100% of the laser welding speed in terms of m/min.

14. The method according to claim 1, wherein protective gas is supplied to the weld melt during the laser welding.

15. The method according to claim 14, wherein pure argon or a mixture of argon and carbon dioxide is used as the protective gas.

* * * * *